(12) United States Patent
Bryan et al.

(10) Patent No.: US 11,232,398 B2
(45) Date of Patent: Jan. 25, 2022

(54) SYSTEM AND METHOD FOR IMAGE-BASED REPLENISHMENT

(71) Applicant: Walmart Apollo, LLC, Bentonville, AR (US)

(72) Inventors: Greg A. Bryan, Bentonville, AR (US); Benjamin D. Enssle, Bella Vista, AR (US); Jesse Lee Eaton, Jr., Springdale, AR (US); Cristy Crane Brooks, Cassville, MO (US); Jeffrey Kerbs, Bentonville, AR (US); David Brightwell, Bentonville, AR (US); Ryan Kee, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 151 days.

(21) Appl. No.: 16/582,651

(22) Filed: Sep. 25, 2019

(65) Prior Publication Data
US 2020/0097896 A1 Mar. 26, 2020

Related U.S. Application Data

(60) Provisional application No. 62/736,671, filed on Sep. 26, 2018.

(51) Int. Cl.
*G06Q 10/08* (2012.01)
*G06K 9/00* (2006.01)
(Continued)

(52) U.S. Cl.
CPC ....... *G06Q 10/087* (2013.01); *G06K 9/00624* (2013.01); *G06Q 10/06311* (2013.01); *G06Q 30/0202* (2013.01)

(58) Field of Classification Search
CPC .......... G06Q 10/087; G06Q 10/06311; G06Q 30/0202; G06K 9/00624; G06K 9/00771
(Continued)

(56) References Cited

U.S. PATENT DOCUMENTS

| 7,398,232 B2 * | 7/2008 | Renz ...................... G06Q 10/06 705/28 |
| 7,953,632 B2 * | 5/2011 | Salerno .................. G06Q 50/12 705/15 |

(Continued)

OTHER PUBLICATIONS

Cognizant, Planogram Compliance: Making It Work. cognizant 20-20 insights. 7 pages, Nov. 2013.
(Continued)

*Primary Examiner* — Garcia Ade
(74) *Attorney, Agent, or Firm* — Fitch, Even, Tabin & Flannery LLP (57) ABSTRACT

Systems, methods, and machine readable media are provided for image-based replenishment. In exemplary embodiments, a system periodically obtains an image from one or more imaging devices in a facility of a selected rack of items among a group of racks. The system determines, based on the image, a first volume indicative of a volume of items on the rack. The system retrieves a sales forecast for the items on the selected rack and determines an expected second volume of items on the rack based on the sales forecast for the item. The system then determines whether the first volume is within a predetermined threshold of the second volume, and transmits instructions based on whether or not the first volume is determined to be within the predetermined threshold of the second volume.

23 Claims, 6 Drawing Sheets

(51) Int. Cl.
*G06Q 10/06* (2012.01)
*G06Q 30/02* (2012.01)

(58) Field of Classification Search
USPC .......................................................... 705/28
See application file for complete search history.

(56) References Cited

U.S. PATENT DOCUMENTS

| | | | |
|---|---|---|---|
| 8,091,782 B2 | 1/2012 | Cato et al. | |
| 9,659,272 B2* | 5/2017 | Birch | G06Q 10/087 |
| 2006/0085295 A1 | 4/2006 | Droste et al. | |
| 2013/0235206 A1* | 9/2013 | Smith | G06Q 10/087 |
| | | | 348/150 |
| 2015/0262116 A1 | 9/2015 | Katircioglu et al. | |
| 2017/0286773 A1 | 10/2017 | Skaff et al. | |
| 2018/0322448 A1* | 11/2018 | Nemati | G06K 9/00771 |

OTHER PUBLICATIONS

Moorthy et al., Applying Image Processing for Detecting On-Shelf Availability and Product Positioning in Retail Stores. WCI '15 Proceedings of the Third International Symposium on Women in Computing and Informatics. pp. 451-457, (2015).

\* cited by examiner

SYSTEM AND METHOD FOR IMAGE-BASED REPLENISHMENT

RELATED APPLICATION

This application claims the benefit of, and priority to, U.S. Provisional Patent Application No. 62/736,671, entitled "System and Method for Image-Based Replenishment", filed Sep. 26, 2018, the contents of which are incorporated herein by reference in their entirety.

BACKGROUND

In a retail setting, the tracking of inventory on a retail floor is an important component of the efficient operation of the facility. Typically an inventory is performed for a rack of items based on how many items are remaining on the rack at a certain time. Based on the number of items remaining on a rack, a determination can be made regarding whether the rack should be replenished.

SUMMARY

In one embodiment, an image-based replenishment system is provided. The system includes one or more imaging devices disposed in a facility. The facility includes racks configured to hold multiple items, each rack equipped with a location sensor. The system further includes one or more databases holding rack assignment information for the racks, the rack assignment information including an assigned volume for each of the racks, a category of item for items assigned to each of the racks, and an associated threshold value for each category. The system also includes a computing device communicatively coupled to the one or more imaging devices, the location sensors and the databases and configured to execute a replenishment module. The replenishment module when executed periodically obtains an image of a selected rack among the racks from the one or more imaging devices. The system determines, based on the image, a first volume indicative of a volume of items on the rack. The system retrieves a sales forecast for the items on the selected rack and determines an expected second volume of items on the rack based on the sales forecast for the item. The system then determines whether the first volume is within a predetermined threshold of the second volume and transmits instructions based on the whether the first volume is determined to be within the predetermined threshold of the second volume. The instructions can include submitting an order to a replenishment system for an additional quantity of the items on the selected rack to be delivered to the facility. The instructions may also reference location data from the location sensor associated with the selected rack and determine a particular rack needs to be replenished, and there are items in stock that can be used to replenish the rack of items. When the first volume is determined to not be within the predetermined threshold of the second volume, the instructions are transmitted to an individual in the facility and instruct the individual to perform an action, the action being at least one of changing a location of the rack of items, changing of a price of the items on the selected rack, and removal of the items from the selected rack, the instructions referencing location data from the location sensor associated with the selected rack.

In another embodiment, a computer implemented method for image-based replenishment is provided. The method includes periodically obtaining an image of a selected rack among a group of racks from the one or more imaging devices and determining, based on the image, a first volume indicative of a volume of items on the rack. The method further includes retrieving a sales forecast for the items on the selected rack from one or more databases and determining an expected second volume of items on the rack based on the sales forecast for the item. The method also includes determining whether the first volume is within a predetermined threshold of the second volume, and transmitting instructions based on the whether the first volume is determined to be within the predetermined threshold of the second volume and transmits instructions based on the whether the first volume is determined to be within the predetermined threshold of the second volume. The instructions can include submitting an order to a replenishment system for an additional quantity of the items on the selected rack to be delivered to the facility. The instructions may also reference location data from the location sensor associated with the selected rack and determine a particular rack needs to be replenished, and there are items in stock that can be used to replenish the rack of items. When the first volume is determined to not be within the predetermined threshold of the second volume, the instructions are transmitted to an individual in the facility and instruct the individual to perform an action, the action being at least one of changing a location of the rack of items, changing of a price of the items on the selected rack, and removal of the items from the selected rack, the instructions referencing location data from the location sensor associated with the selected rack.

In another embodiment, a non-transitory machine-readable medium is provided that stores instructions executable by a processing device. Execution of the instructions causes the processing device to implement a method for image-based replenishment. The method includes periodically obtaining an image of a selected rack among a group of racks from the one or more imaging devices and determining, based on the image, a first volume indicative of a volume of items on the rack. The method further includes retrieving a sales forecast for the items on the selected rack and determining an expected second volume of items on the rack based on the sales forecast for the item. The method also includes determining whether the first volume is within a predetermined threshold of the second volume, and transmitting instructions based on the whether the first volume is determined to be within the predetermined threshold of the second volume and transmits instructions based on the whether the first volume is determined to be within the predetermined threshold of the second volume. The instructions can include submitting an order to a replenishment system for an additional quantity of the items on the selected rack to be delivered to the facility. The instructions may also reference location data from the location sensor associated with the selected rack and determine a particular rack needs to be replenished, and there are items in stock that can be used to replenish the rack of items. When the first volume is determined to not be within the predetermined threshold of the second volume, the instructions are transmitted to an individual in the facility and instruct the individual to perform an action, the action being at least one of changing a location of the rack of items, changing of a price of the items on the selected rack, and removal of the items from the selected rack, the instructions referencing location data from the location sensor associated with the selected rack.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Exemplary embodiments provide an image-based replenishment system. In one embodiment a system includes a computing device executing a replenishment module that obtains an image from one or more imaging devices in a facility of a selected rack among a group of racks. The replenishment module determines, based on the image, a first volume indicative of a volume of items on the rack and retrieves a sales forecast for the items on the selected rack. The replenishment module further determines an expected second volume of items on the rack based on the sales forecast for the item and determines whether the first volume is within a predetermined threshold of the second volume. As discussed further below, based on the determination as to whether or not the first volume is within the predetermined threshold of the second volume, the replenishment module transmits instructions to a replenishment system, a designated individual or a computing device for subsequent action.

Figure 1:
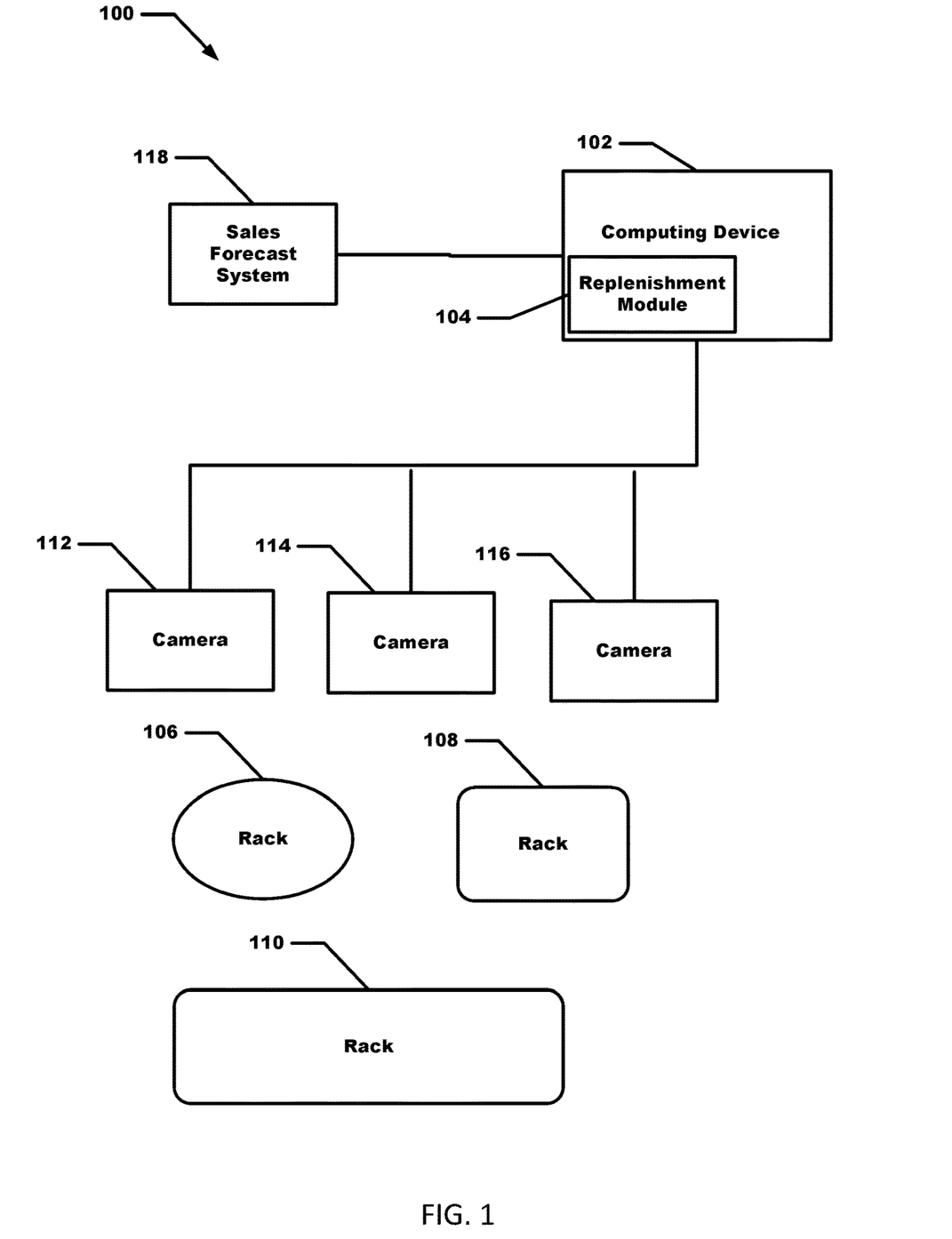
FIG. 1 is a block diagram showing a system for image-based replenishment, according to an example embodiment.

FIG. 1 is a block diagram showing an image-based replenishment system 100. The system 100 includes a computing device 102 which executes a replenishment module 104. The replenishment module 104 may include various circuits, circuitry and one or more software components, programs, applications, or other units of code base or instructions configured to be executed by one or more processors. Also shown are racks 106, 108 and 110 utilized for displaying items. The system includes one or more cameras 112, 114, 116 used for capturing images of racks of items. For example camera 112 may capture images of rack 106, camera 114 may capture images of rack 108, and camera 116 may capture images of rack 110. The computing device 102 is in communication with the cameras 112, 114 and 116. The computing device 102 is also in communication with a sales forecast system 118 that includes one or more databases holding historical sales data for the facility and similar other facilities.

The cameras 112, 114 and 116 periodically transmit images of the racks of items to computing device 102. The replenishment module 104 determines a first volume from the images of the racks captured by the cameras and compares the first volume to a second volume that is based on sales forecast for the particular item. The sales forecast may be retrieved by the replenishment module 104 from databases associated with sales forecast system 118. For example, the sales forecast 118 system may generate sales forecasts for different items based on historical sales data of that item at the present facility or at a similarly situated facility. The historical sales data may include sales data for different times of the year and may reflect historical sales data for different weather conditions. The replenishment module 104 determines whether the first volume of data for the rack is within a predetermined threshold of the second volume and transmits instructions based on whether the first volume is determined to be within the predetermined threshold of the second volume. Put another way, the replenishment module 104 determines whether or not the current volume of items remaining on the rack indicates whether the item is selling as quickly as expected. The instructions generated by replenishment module 104 can include submitting an order to a replenishment system for an additional quantity of the items on the selected rack to be delivered to the facility when items are selling well and the first volume is within the pre-determined threshold of the second volume. The instructions may also reference location data from the location sensor associated with the selected rack, determine a particular rack needs to be replenished, and that there are items in stock that can be used to replenish the rack of items. When the first volume is determined to not be within the predetermined threshold of the second volume, the instructions may be transmitted to an individual in the facility to instruct the individual to perform an action. For example, the instructions may be for the individual to the change a location of the rack of items in the facility, change a price of the items on the selected rack, and/or remove of the items from the selected rack. In one embodiment, the instructions are transmitted from computing device 102 to a mobile device associated with the individual.

Figure 2:
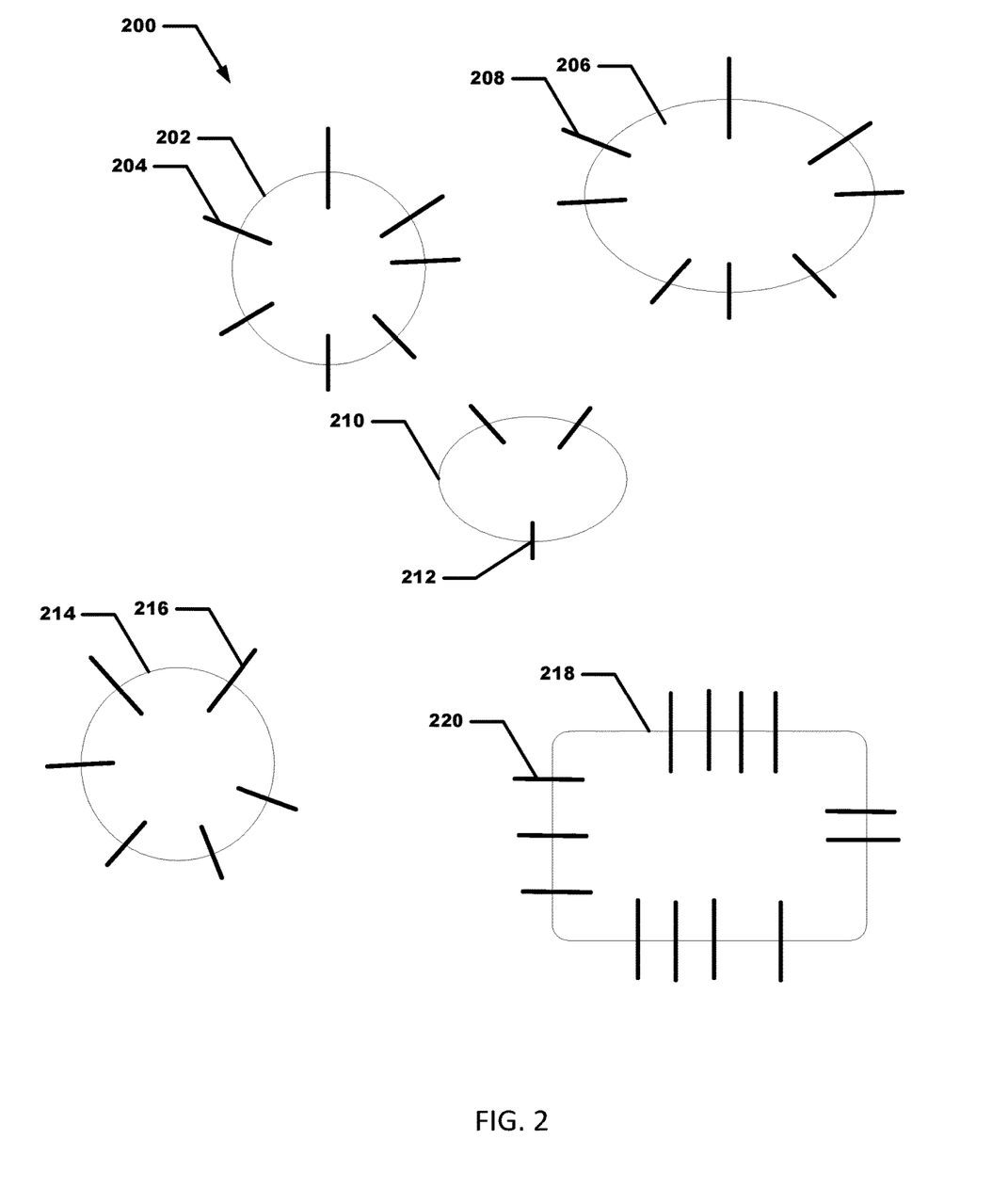
FIG. 2 is a diagram showing example racks of items, according to an example embodiment.

FIG. 2 is a block diagram showing a first group of racks 200. There are five different racks. Rack 202 includes items 204, rack 206 includes items 208, rack 210 includes item 212, rack 214 includes items 216 and rack 218 includes items 220. Each rack has a different volume based on the amount of items remaining on the rack. For example, rack 210 is almost empty, while rack 218 is nearly full. By using volume instead of a count of items, the volume measurement is strictly based on free space available on the rack, regardless of the number of items on the rack.

In one embodiment to calculate volume the system has stocked images of full and empty racks, one image each. Current images of the racks are then captured and compared to determine current volume. The current volume may be determined by calculating how much x-y space is consumed by the items on the rack. This creates a single data point for "filled space", rather than trying to count items. For example, an empty rack may have occupied volume of 1.347 $ft^2$ of space, and the same rack filled with the particular item assigned to it may have an occupied volume of 6.934 $ft^2$. If the camera sees 4.501 $ft^2$ of filled space at the location, then the rack is 64% full (4501/6934). The determined volume may be compared to a sales forecast indicating an expected volume and/or compared to an inventory record indicating the expected volume of the rack. Pre-determined thresholds (e.g.: 5 or 10% as non-limiting examples) may be set to determine when the image-based volume meets expectations. . . . Racks not meeting expectations may result in item price-drops of the items, racks being moved to a more likely location in the facility for sales (or deemphasized to a back corner to make way for faster selling items), and items being removed from the rack. Racks meeting expectations may have their contents replenished and additional items may be automatically ordered. Different items occupy different volumes, so a different volume is needed in the inventory database for each type of item. For example, a rack completely jammed full of baby onesies if going to occupy a much smaller area than a rack filled with men's jackets.

Figure 3A:
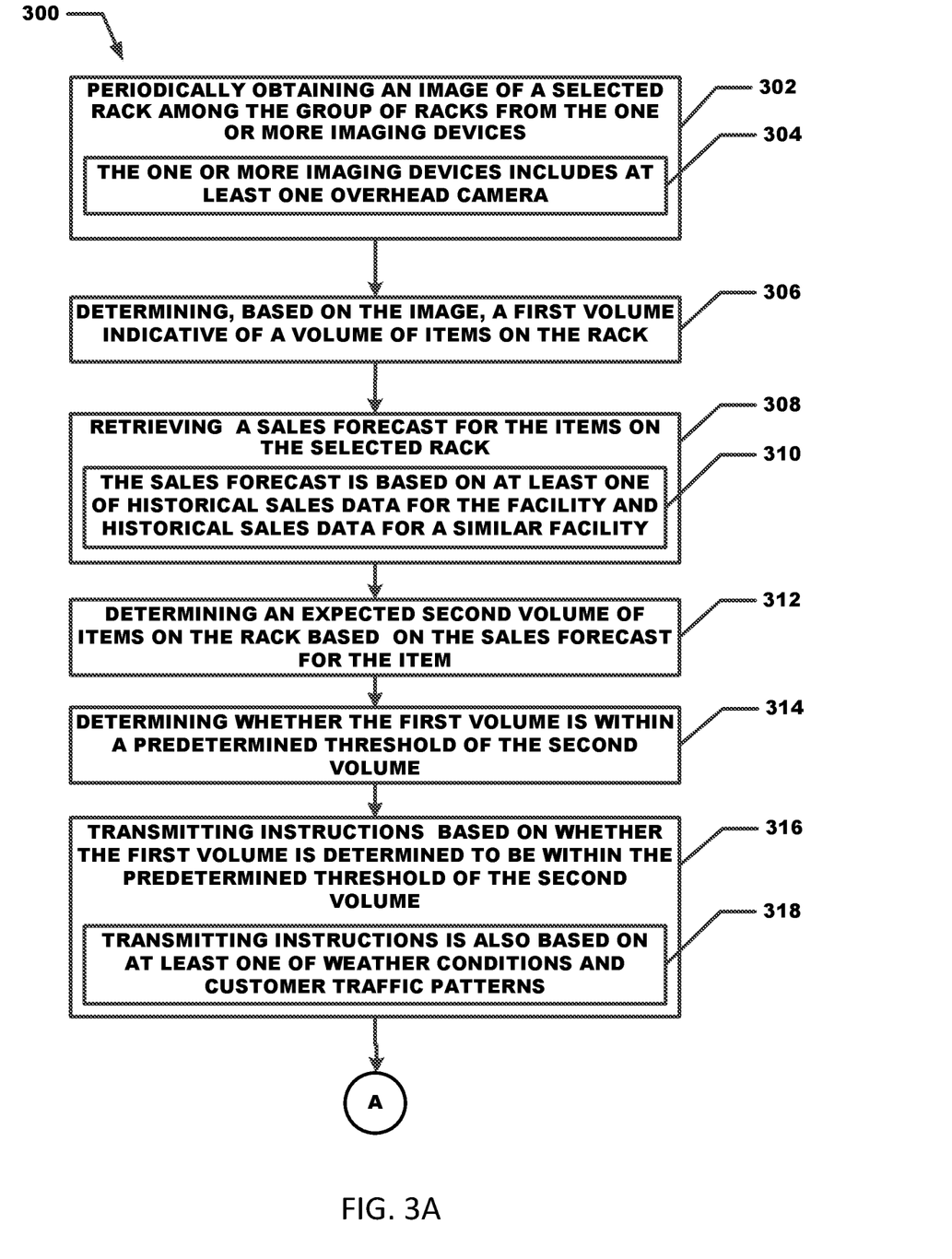
FIGS. 3A and 3B are flowcharts illustrating an exemplary method for image-based replenishment, according to an example embodiment.
Figure 3B:
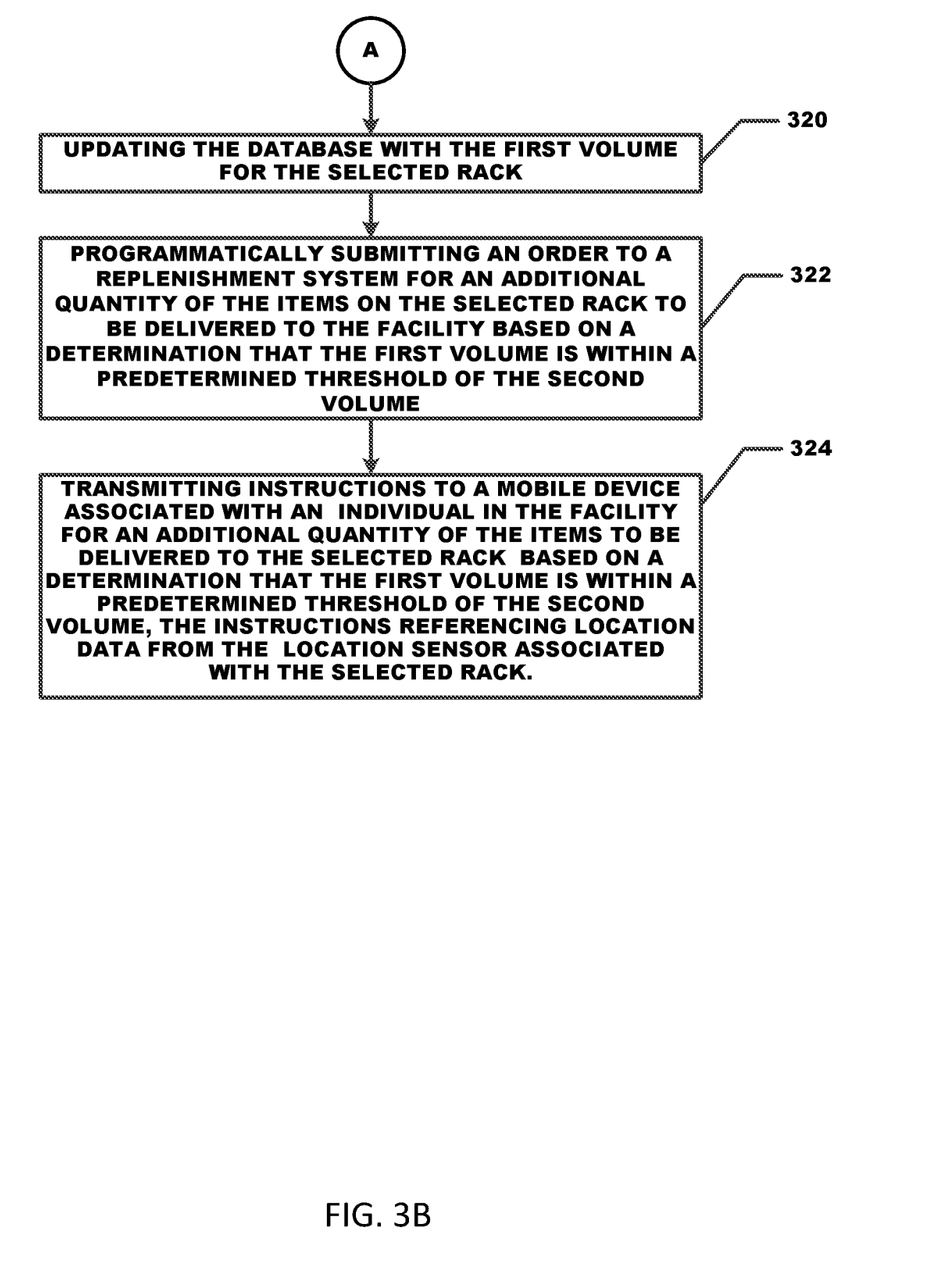

FIGS. 3A to 3B are flow diagrams showing illustrative processing that can be implemented within a system for image-based replenishment in an exemplary embodiment. Rectangular elements are herein denoted "processing blocks" and represent steps that may be performed at least partly by computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

FIGS. 3A to 3B are flowcharts illustrating an exemplary method 300 for image-based replenishment, according to an example embodiment. The method 300 begins with periodically obtaining an image from one or more imaging devices in a facility of a selected rack among a group of racks (step 302). In certain embodiments the imaging device is an overhead camera (step 304). The images captured by the camera are used for volume determinations, therefore an overhead camera may be preferred to provide the optimal viewing angle of the rack for volume determinations.

Based on the image, a determination is made regarding a first volume measurement indicative of a volume of items on the rack (step 306). It should be noted that a volume determination is performed instead of counting the number of items remaining on the rack or keeping track of how many items are removed from the rack. The counting of items tends to be labor intensive and prone to error.

Next, a sales forecast for the items on the selected rack is received (step 308). The sales forecast is retrieved from a sales forecast system. The sales forecast system is used to predict volumes of sales for particular items. In one embodiment the sales forecast system may leverage historical facility sales data that includes data for different times of the year, different times of day and/or different weather conditions. As shown in processing block 310 the sales forecast is based on at least one of historical sales data for the present facility and historical sales data for a similarly-situated facility (e.g. a facility of the same size and/or the same type of geographic location).

A determination is made regarding an expected second volume of items on the rack based on the sales forecast for the item (step 312). As a non-limiting example, if the sales forecast indicates that half the items on the rack should have been sold by the current time, the second volume indicating the expected volume would be 50%.

A determination is then made whether the first volume is within a predetermined threshold of the second volume (step 314). This is performed to provide an indication of how sales for the item are meeting sales goals.

Instructions are transmitted based on whether or not the first volume is determined to be within the predetermined threshold of the second volume (step 316). The instructions may also be transmitted wherein the instructions are based on at least one of weather conditions and customer traffic patterns (step 318). For example, the instructions may be modified based on weather conditions outside the facility and/or traffic disruptions.

The database may be updated with the first volume for the selected rack (step 320). In this manner the database is kept up to date with the latest volume of items on the rack.

An order may be programmatically submitted to a replenishment system for an additional quantity of the items on the selected rack to be delivered to the facility based on a determination that the first volume is within a predetermined threshold of the second volume (step 322). In this instance, because the items are selling, more items are required to replenish the rack of items. The instructions reference location data from the location sensor associated with the selected rack.

Instructions may be transmitted to a mobile device associated with an individual in the facility for an additional quantity of the items to be delivered to the selected rack based on a determination that the first volume is within a predetermined threshold of the second volume, the instructions referencing location data from the location sensor associated with the selected rack. In this instance the rack needs to be replenished, and there are items in stock that can be used to replenish the rack of items (step 324). It will be appreciated that the instructions could also generate a display of instructions to the individual on a non-mobile device (such as a facility display screen) or generate audible instructions to the individual via a speaker system in the facility.

When the first volume is determined to not be within the predetermined threshold of the second volume, the instructions may also be transmitted to an individual in the facility. The instructions may instruct the individual to perform an action such as changing a location of the rack of items, changing a price of the items on the selected rack, and removing the items from the selected rack. The instructions may reference location data from the location sensor associated with the selected rack. In this instance where the threshold is not met, the items have not met the sales expectations. There could be several reasons for this, including the rack needing to be placed in an area that has more customer traffic, the price may need to be lowered to attract more sales of the items, and the items may not be popular in this particular facility (for example the demand for swim suits may be less in Alaska than in California).

Figure 4:
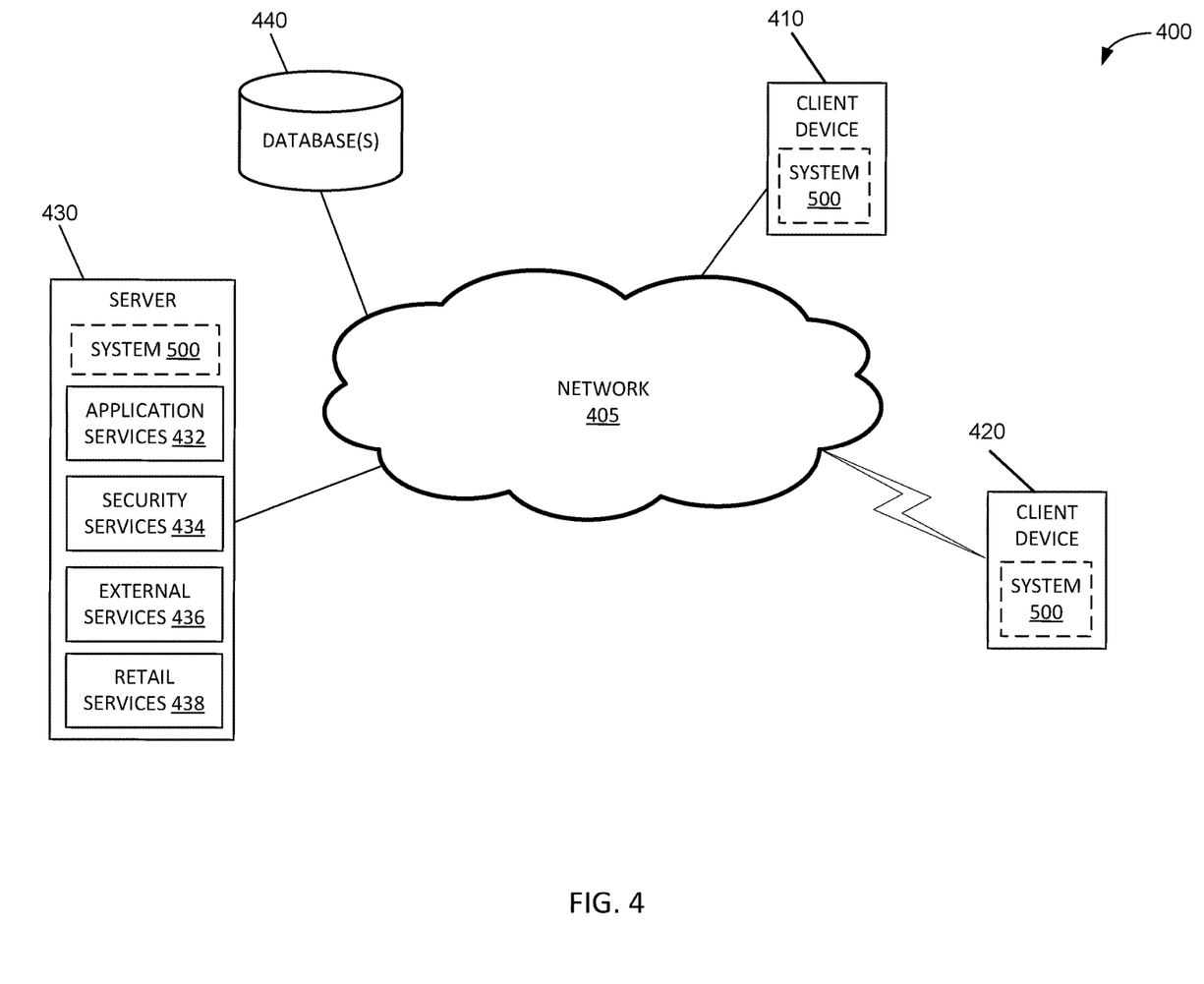
FIG. 4 is a diagram of an exemplary network environment suitable for practicing exemplary embodiments.

FIG. 4 illustrates a network diagram depicting a system 400 for implementing the image-based replenishment system, according to an example embodiment. The system 400 can include a network 405, multiple client devices, for example, client device 410, client device 420, a server 430, and database(s) 440. Each of the client devices 410, 420, server 430, and database(s) 440 is in communication with the network 405.

In an example embodiment, one or more portions of network 405 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 410, 420 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 410, 420 may connect to network 405 via a wired or wireless connection. In an example embodiment, the client devices 410, 420 may perform one or more of the functionalities of the image-based replenishment system 100 described herein, or transmit data or signals to the image-based replenishment system 100 described herein. The client device 410, 420 can include one or more components of computing device 500 of FIG. 5.

In an example embodiment, the image-based replenishment system 100 may be included at least in part on the client device 410, 420, and the client device 410, 420 performs one or more of the functionalities of the system described herein. In an example embodiment, the image-based replenishment system 100 may be included at least in part on the server 430, and the server 430 performs one or more of the functionalities of the image-based replenishment system 100 described herein.

The database(s) 440 comprise one or more storage devices for storing data and/or instructions (or code) for use by the server 430 and/or the client devices 410, 420. Each of the database(s) 440 and the server 430 is connected to the network 405 via a wired connection. Alternatively, one or more of the database(s) 440 and server 430 may be connected to the network 405 via a wireless connection. The server 430 comprises one or more computers or processors configured to communicate with the client devices 410, 420 via network 405. The server 430 can include one or more components of device 500 of FIG. 5. Server 430 hosts one or more software systems, applications or websites, including one or more components of the image-based replenishment system 100 described herein and/or facilitates access to the content of database(s) 440.

In an example embodiment, the server 430 also includes various software services that facilitate the functionalities of the image-based replenishment system 100. Theses services include application services 432, security services 434, external services 436 and retail services 438. Database(s) 440 and server 430 may be located at one or more geographically distributed locations from each other or from client devices 410, 420. Alternatively, database(s) 440 may be included within server 430.

Figure 5:
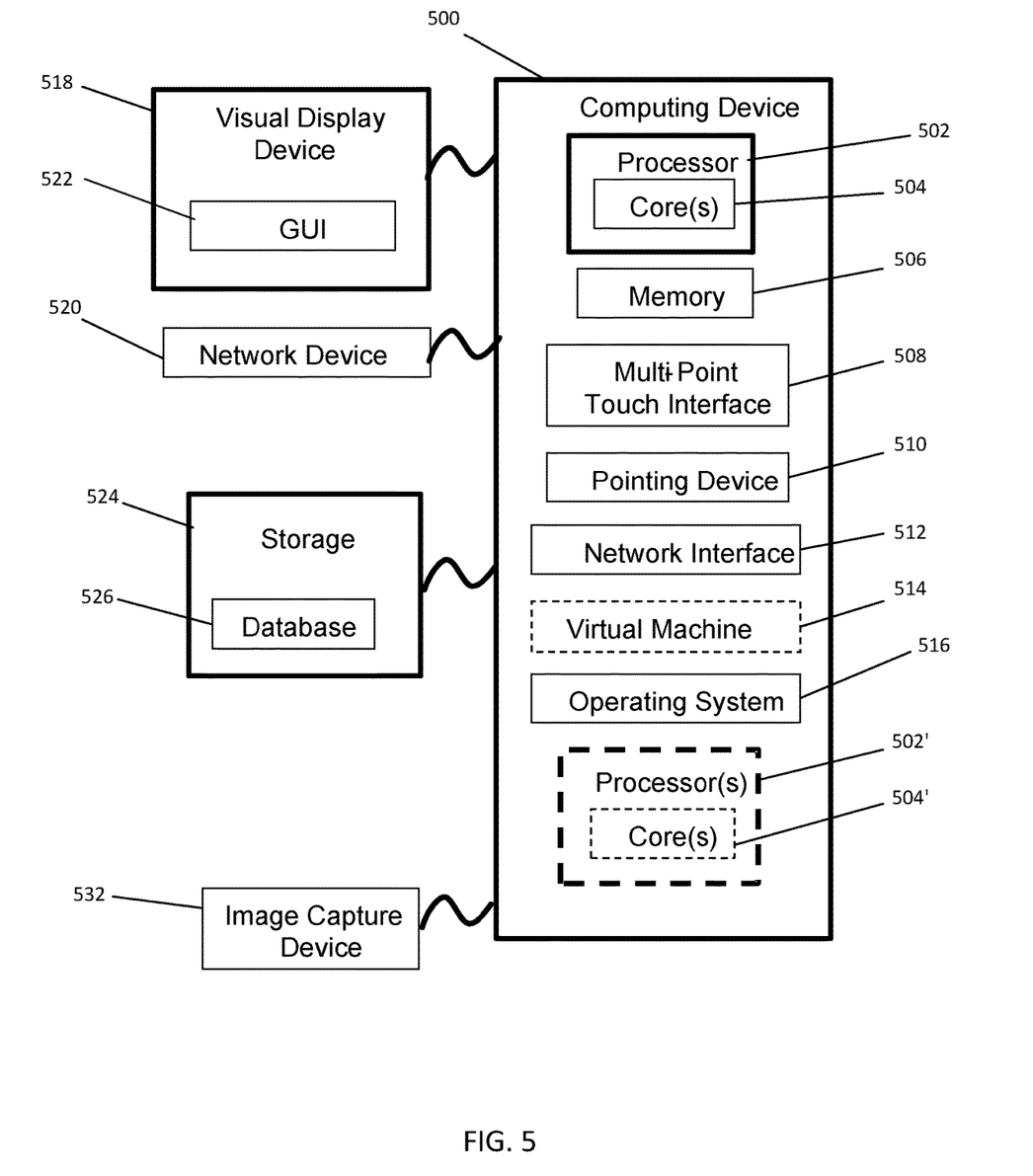
FIG. 5 is a block diagram of an exemplary computing device that may be used to implement exemplary embodiments described herein.

FIG. 5 is a block diagram of an exemplary computing device 500 that can be used to perform one or more steps of the methods provided by exemplary embodiments. For example, computing device 500 may be the client device 410, 420 and the server 430 as described in FIG. 4. The computing device 500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 506 included in the computing device 500 can store computer-readable and computer-executable instructions or software for implementing exemplary embodiments. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can include a computer system memory or random access memory, such as DRAM, SRAM, EDO RAM, and the like. Memory 506 can include other types of memory as well, or combinations thereof. An individual can interact with the computing device 500 through a visual display device 518, such as a touch screen display or computer monitor, which can display one or more user interfaces 522 for receiving data from the individual (e.g., order data and travel data). The visual display device 518 can also display other aspects, elements and/or information or data associated with exemplary embodiments. The computing device 500 can include other I/O devices for receiving input from a individual, for example, a keyboard or another suitable multi-point touch interface 508, a pointing device 510 (e.g., a pen, stylus, mouse, or trackpad). The keyboard 508 and the pointing device 510 can be coupled to the visual display device 518. The computing device 500 can include other suitable conventional I/O peripherals.

The computing device 500 can also include one or more storage devices 524, such as a hard-drive, CD-ROM, or other computer readable media, for storing data and computer-readable instructions and/or software, such as one or more modules of the system 100 shown in FIG. 1 that implements exemplary embodiments of the image-based replenishment system as described herein, or portions thereof, which can be executed to generate user interface 522 on display 518. Exemplary storage device 524 can also store one or more databases 526 for storing suitable information required to implement exemplary embodiments. The databases can be updated by an individual or automatically at a suitable time to add, delete or update one or more items in the databases. Exemplary storage device 524 can store one or more databases 526 for storing provisioned data, and other data/information used to implement exemplary embodiments of the systems and methods described herein.

The computing device 500 can include a network interface 512 configured to interface via one or more network devices 520 with one or more networks, for example, Local Area Network (LAN), Wide Area Network (WAN) or the Internet through a variety of connections including, but not limited to, standard telephone lines, LAN or WAN links (for example, 802.11, T1, T3, 46 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or another device suitable for interfacing the computing device 500 to a type of network capable of communication and performing the operations described herein. Moreover, the computing device 500 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein. The computing device can include an image capture device 532 such as a camera for capturing still pictures or for capturing videos.

The computing device 500 can run an operating system 516, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 516 can be run in native mode or emulated mode. In an exemplary embodiment, the operating system 516 can be run on one or more cloud machine instances.

The description is presented to enable a person skilled in the art to create and use a computer system configuration and related method and systems for image-based replenishment. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. An image-based replenishment system, comprising:
one or more imaging devices disposed in a facility;
a plurality of racks configured to hold a plurality of items, each rack equipped with a location sensor;
one or more databases holding sales forecasts and rack assignment information for the plurality of racks, the rack assignment information including an assigned volume for each of the plurality of racks, a category of item from the plurality of items assigned to each of the plurality of racks, and an associated threshold value for each category; and
a computing device communicatively coupled to the one or more imaging devices, the location sensors and the one or more databases and configured to execute a replenishment module that when executed:
periodically obtains an image of a selected rack among the plurality of racks from the one or more imaging devices;
determines for a first time, based on the image, a first volume indicative of a volume of items on the rack;
retrieves a sales forecast for the items on the selected rack from the one or more databases;
determines an expected second volume of items on the rack at the first time based on the sales forecast for the item;
determines whether the first volume is within a predetermined threshold of the second volume; and
transmits instructions based on whether the first volume is determined to be within the predetermined threshold of the second volume.

2. The system of claim 1 wherein the execution of the replenishment module updates the one or more databases with the first volume for the selected rack; and
programmatically submits an order to a replenishment system for an additional quantity of the items on the selected rack to be delivered to the facility based on a determination that the first volume is within a predetermined threshold of the second volume.

3. The system of claim 1 wherein the execution of the replenishment module:
transmits instructions to a mobile device associated with an individual in the facility for an additional quantity of the items to be delivered to the selected rack based on a determination that the first volume is within a predetermined threshold of the second volume, the instructions referencing location data from the location sensor associated with the selected rack.

4. The system of claim 1 wherein the first volume is determined to not be within the predetermined threshold of the second volume, and wherein the instructions are transmitted to an individual in the facility and instruct the individual to perform an action, the action being at least one of a change a location of the rack of items, a change of a price of the items on the selected rack, and a removal of the items from the selected rack, the instructions referencing location data from the location sensor associated with the selected rack.

5. The system of claim 1 wherein the sales forecast is based on at least one of historical sales data for the facility and historical sales data for a similar facility.

6. The system of claim 1 wherein the one or more imaging devices includes at least one overhead camera.

7. The system of claim 1 wherein the transmittal of instructions is also based on at least one of weather conditions and customer traffic patterns.

8. The system of claim 1 wherein the item is one of a seasonal item and apparel.

9. A computer-implemented method for image-based replenishment, the method comprising:
periodically obtaining an image of a selected rack among the plurality of racks from the one or more imaging devices;
determining for a first time, based on the image, a first volume indicative of a volume of items on the rack;
retrieving a sales forecast from one or more databases for the items on the selected rack;
determining at the first time an expected second volume of items on the rack based on the sales forecast for the item;
determining whether the first volume is within a predetermined threshold of the second volume; and
transmitting instructions based on whether the first volume is determined to be within the predetermined threshold of the second volume.

10. The method of claim 9 further comprising updating the one or more databases with the first volume for the selected rack; and
programmatically submitting an order to a replenishment system for an additional quantity of the items on the selected rack to be delivered to the facility based on a determination that the first volume is within a predetermined threshold of the second volume.

11. The method of claim 9 further comprising transmitting instructions to a mobile device associated with an individual in the facility for an additional quantity of the items to be delivered to the selected rack based on a determination that the first volume is within a predetermined threshold of the second volume, the instructions referencing location data from the location sensor associated with the selected rack.

12. The method of claim 9 wherein the first volume is determined to not be within the predetermined threshold of the second volume, and wherein the instructions are transmitted to an individual in the facility and instruct the individual to perform an action, the action being at least one of changing a location of the rack of items, changing of a price of the items on the selected rack, and removal of the items from the selected rack, the instructions referencing location data from the location sensor associated with the selected rack.

13. The method of claim 9 wherein the sales forecast is based on at least one of historical sales data for the facility and historical sales data for a similar facility.

14. The method of claim 9 wherein the one or more imaging devices includes at least one overhead camera.

15. The method of claim 9 wherein the transmitting instructions is also based on at least one of weather conditions and customer traffic patterns.

16. A non-transitory machine-readable medium storing instructions executable by a processing device, wherein execution of the instructions causes the processing device to implement a method for image-based replenishment, the method comprising:
periodically obtaining an image of a selected rack among the plurality of racks from the one or more imaging devices;
determining at a first time, based on the image, a first volume indicative of a volume of items on the rack;
retrieving a sales forecast from one or more databases for the items on the selected rack;
determining at the first time an expected second volume of items on the rack based on the sales forecast for the item;
determining whether the first volume is within a predetermined threshold of the second volume; and
transmitting instructions based on whether the first volume is determined to be within the predetermined threshold of the second volume.

17. The non-transitory machine-readable medium of claim 16 wherein the method further comprises updating the one or more databases with the first volume for the selected rack; and
programmatically submitting an order to a replenishment system for an additional quantity of the items on the selected rack to be delivered to the facility based on a determination that the first volume is within a predetermined threshold of the second volume.

18. The non-transitory machine-readable medium of claim 16 wherein the method further comprises transmitting instructions to a mobile device associated with an individual in the facility for an additional quantity of the items to be delivered to the selected rack based on a determination that the first volume is within a predetermined threshold of the second volume, the instructions referencing location data from the location sensor associated with the selected rack.

19. The non-transitory machine-readable medium of claim 16 wherein the first volume is determined to not be within the predetermined threshold of the second volume, and wherein the instructions are transmitted to an individual in the facility and instruct the individual to perform an action, the action being at least one of changing a location of the rack of items, changing of a price of the items on the selected rack, and removal of the items from the selected rack, the instructions referencing location data from the location sensor associated with the selected rack.

20. The non-transitory machine-readable medium of claim 16 wherein the sales forecast is based on at least one of historical sales data for the facility and historical sales data for a similar facility.

21. The system of claim 1, wherein the computing device comprises a mobile device, a hand-held device, a wireless device, a portable device, a wearable computer, a cellular or mobile phone, a portable digital assistant (PDA), a smart phone, a smart watch, a tablet, an ultrabook, a netbook, a laptop, a desktop, a multi-processor system, or microprocessor-based or programmable consumer electronics.

22. The method of claim 9, wherein a computing device executes at least some the steps and the computing device comprises a mobile device, a hand-held device, a wireless device, a portable device, a wearable computer, a cellular or mobile phone, a portable digital assistant (PDA), a smart phone, a smart watch, a tablet, an ultrabook, a netbook, a laptop, a desktop, a multi-processor system, or microprocessor-based or programmable consumer electronics.

23. The non-transitory machine-readable medium of claim 16, wherein the processing device comprises a mobile device, a hand-held device, a wireless device, a portable device, a wearable computer, a cellular or mobile phone, a portable digital assistant (PDA), a smart phone, a smart watch, a tablet, an ultrabook, a netbook, a laptop, a desktop, a multi-processor system, or microprocessor-based or programmable consumer electronics.

* * * * *

UNITED STATES PATENT AND TRADEMARK OFFICE
CERTIFICATE OF CORRECTION

PATENT NO. : 11,232,398 B2
APPLICATION NO. : 16/582651
DATED : January 25, 2022
INVENTOR(S) : Greg A. Bryan et al.

It is certified that error appears in the above-identified patent and that said Letters Patent is hereby corrected as shown below:

On the Title Page

Column 2, Abstract, Line 1, delete "machine readable" and insert -- machine-readable --, therefor.

In the Claims

Claim 4, Column 11, Line 3, after "of a change," insert -- of --, therefor.

Claim 22, Column 12, Line 61, after "some", insert -- of --, therefor.

Signed and Sealed this
Twentieth Day of September, 2022

Katherine Kelly Vidal
*Director of the United States Patent and Trademark Office*